United States Patent Office 3,663,588
Patented May 16, 1972

3,633,588
CERTAIN DIFLUORAMINO COMPOUNDS
Donald Pilipovich, Canoga Park, and Michael G. Warner, Camarillo, Calif., assignors to North American Rockwell Corporation
Continuation-in-part of application Ser. No. 568,097, July 21, 1966. This application Apr. 18, 1967, Ser. No. 634,031
Int. Cl. C07c 35/02; C07c 87/22
U.S. Cl. 260—453 R
5 Claims

ABSTRACT OF THE DISCLOSURE

The invention relates to the compounds $CF_2(ONF_2)_2$ and $CF_2(ONF_2)OF$ and a method for their production. The method comprises reacting $CF_2(ONF_2)$ and $$MF \cdot HNF_2$$

Figure 1:
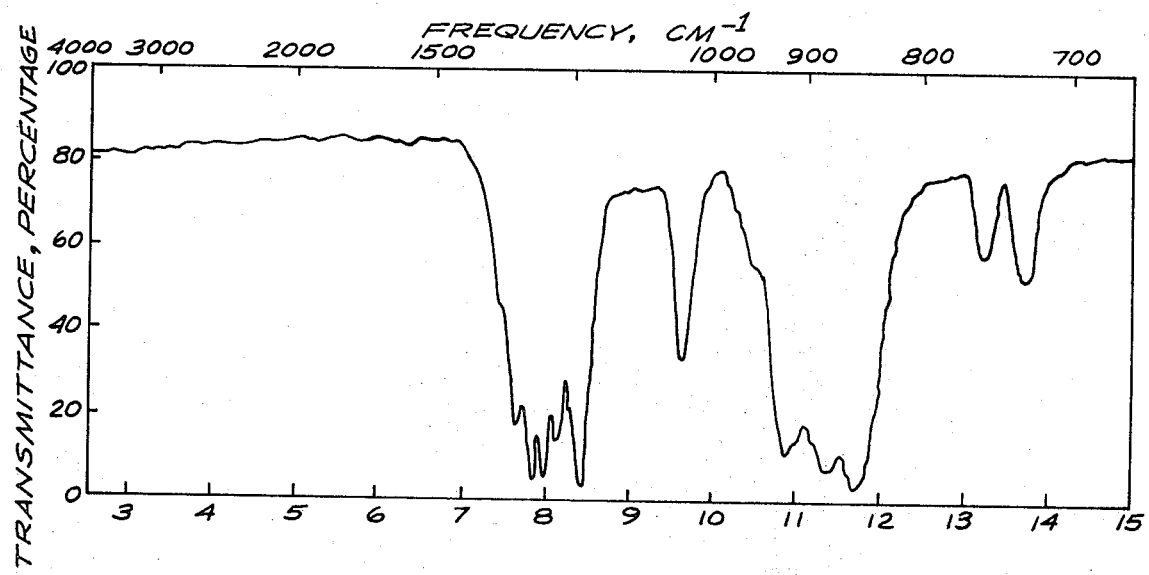

where M is K, Rb and Cs at temperatures between $-126°$ C. and $+27°$ C.

CROSS-REFERENCE TO RELATED APPLICATION

This is a continuation-in-part of application Ser. No. 568,097 filed July 21, 1966, now abandoned.

DESCRIPTION OF THE PRIOR ART

Chemical research in general, and the field of aerospace research in particular, is constantly searching for high energy liquid oxidizers. Many liquid oxidizers, including the most common liquid oxidizer, liquid oxygen, must be stored and handled under cryogenic conditions. Extensive machinery and installation is required to create and maintain these conditions. Cryogenic conditions are consequently difficult to maintain under most field conditions, and especially difficult to maintain in an operational flight vehicle. There is, therefore, a continuing need for oxidizers that may be stored and handled under environments less severe than those termed "cryogenic." Other oxidizers, such as fuming nitric acid, are not cryogenic, but are extremely corrosive in addition to relatively low performance. Their corrosiveness makes them difficult to store and handle. Some oxidizers, such as liquid fluorine, are both corrosive and cryogenic. Virtually all of the liquid oxidizers in the art are corrosive, or cryogenic, or both. There is, therefore, a need for compounds that are high performing liquid oxidizers, and yet are neither corrosive nor cryogenic.

It is an object of this invention to provide new liquid oxidizing compounds, which compounds have numerous utilities in the chemical arts.

It is a further object of this invention to provide novel liquid high energy oxidizer compounds that are neither cryogenic nor corrosive.

A further object of this invention is to provide a method for the preparation of these novel compounds.

SUMMARY OF THE INVENTION

The objects of this invention are accomplished by the novel compounds $F_2C(ONF_2)_x(OF)_y$, where $x$ is a whole integer from 1 through 2, and $y$ is 1 when $x$ is 1 and $y$ is 0 when $x$ is 2. These compounds can be individually described as bis(difluoraminoxy)difluoromethane, $$[F_2C(ONF_2)_2]$$

which for the purposes of this description will be termed Compound 1, and (difluoraminoxy) difluoromethylhypofluorite, $(NF_2OCF_2OF)$, which for the purposes of this description will be termed Compound 2. Both novel compounds of the invention may be prepared by reacting bis(fluoroxy)difluoromethane, $[F_2C(OF)_2]$, with a difluoramine-alkali metal fluoride complex, $MF \cdot HNF_2$, where M is an alkali metal, such as K, Rb and Cs. The compound $MF \cdot HNF_2$ is more extensively discussed in U.S. Pat. No. 3,109,711. Bis(fluoroxy)difluoromethane, $CF_2(OF)_2$, can be prepared conveniently by either of the two following fluorination procedures: (a) the fluorination of carbon dioxide, $CO_2$, in the presence of anhydrous cesium fluoride, CsF, or (b) the fluorination of a fused and finely ground mixture of cesium fluoride and potassium carbonate, $CsF/K_2CO_3$.

(a) The fluorination of $CO_2$

A 300 ml. stainless steel cylinder fitted with a 1/4" needle valve was charged with 5 g. of CsF and 4.46 mmoles of $CO_2$ and 8.92 mmoles of $F_2$. The mixture was held at $-80°$ C. for 24 hours and then the volatile products were separated by vacuum fractional distillation. The $CF_2(OF)_2$ was trapped at $-196°$ C. The yield of $CF_2(OF)_2$ was in the 90–95% range.

(b) The fluorination of $CsF/K_2CO_3$

A fused mixture CsF and $K_2CO_3$ was prepared by melting 5.0 g. of CsF and 4.5 g. of $K_2CO_3$ in a platinum crucible. The mixture was cooled and finely ground in an inert atmosphere and then placed in a 300 ml. stainless steel cylinder fitted with a 1/4" needle valve. The cylinder was charged with 6.72 mmoles of $F_2$ and held at $-80°$ C. for 24 hours. The $CF_2(OF)_2$ was trapped at $-196°$ C. The yield of $CF_2(OF)_2$, based on fluorine conversion, was in the range of 90–95%.

This is the first known reaction of the compound $$MF \cdot HNF_2$$

with an OF group. It is unexpected that this reaction would result in such quantitative addition of an NF group to the OF moiety. The reaction is conducted at temperatures below about 27° C. and above about $-126°$ C. The reaction generally takes at least several hours, but less than a week. When the reaction is performed on a small scale, the reaction products are suitably separated by fractional condensation. A large-scale synthesis could more suitably use other means of conventional low temperature separation known in the art. All of these means would be based upon the differences in boiling or melting points of the compounds desired to be separated.

It can be seen that Compound 2 is an intermediate in the production of Compound 1. The relative amounts of 1 and 2 produced are adjusted by altering the relative amount of difluoramine-alkali metal fluoride complex present in the reaction.

Stoichiometrically, the reaction producing $$F_2C(ONF_2)_2$$

Compound 1, is described by the equation:

(1)  

where M is an alkali metal, such as K, Rb, and Cs.

The reaction producing $NF_2OCF_2OF$, Compound 2, is stoichiometrically described by the following equation:

(2)  

where M is as defined in reaction 1.

It can be seen that the only difference, other than products formed, between reaction 1 and reaction 2 is the amount of $MF \cdot HNF_2$ present. It is this difference which determines the relative amounts of Compound 1 and Compound 2 produced. Since Compound 2 is an intermediary towards the production of Compound 1, some Compound 1 will be present in any actual reaction of $F_2C(OF_2)$ and $MF \cdot HNF_2$. The percentage of Compound 2 produced corresponds to the amount of MF·HNF$_2$ present. A twofold excess of MF·HNF$_2$ will convert all of the Compound 2 produced to Compound 1. The conversion of Compound 2 to Compound 1 is described by the equation:

(3) F$_2$C(ONF$_2$)OF + MF·HNF$_2$ → F$_2$C(ONF$_2$)$_2$ + MHF$_2$
(Compound 2)          (Compound 1)

where M is as previously defined.

The reactions of the invention are preferably conducted in a cold, sealed reaction vessel. Preferred reaction temperatures are between about −126° C. and about ambient temperature. The preferred reaction temperature is about −80° C. Side products are formed in all three reactions. These side products include NF$_3$, N$_2$F$_4$, and COF$_2$. After reaction, the contents of the reaction vessel are suitably passed through a series of successively colder traps, effecting fractional condensation. The novel compounds of the invention will be found to have condensed first, being considerably less volatile than the side products of the reaction. Compound 1 will condense before Compound 2. Using a properly designed fractional condensation system, the novel compounds of the invention may accordingly be separated from each other and also from side products.

The pressure at which the reaction takes place would not appear to be critical. In practice, ambient pressure and that resulting from the presence of the reactants has been used. The apparatus used in that typically found in the art, and need not be of any special material, glass and metal both having been used.

CF$_2$(ONF$_2$)$_2$ — Compound 1

CF$_2$(ONF$_2$)$_2$ is unusual in that it is the first known compound to have two ONF$_2$ groups on the same carbon atom. It is a gas at ambient conditions, and has a boiling point of about −9° C. It forms a glass at −196° C. Its characteristic infrared absorption spectra is illustrated in FIG. 1. The compound exhibits strong absorption, caused by the C—F bond, in the eight micron region. Strong absorptions, caused by ONF$_2$, in the eleven to twelve micron range are also present.

A stable mass fragmentation pattern was obtained for the compound, using a mass spectrometer having a 180° magnetic sector geometry. The m/e distribution recorded at 70 volts, along with the ion assignments, is shown in Table I.

TABLE I.—MASS SPECTRUM OF CF$_2$(ONF$_2$)$_2$

| m/e | Abundance | Ion |
| --- | --- | --- |
| 30 | 70.5 | NO+ |
| 33 | 14.7 | NF+ |
| 47 | 44.3 | CFO+ |
| 50 | 2.2 | CF$_2$+ |
| 52 | 100.0 | NF$_2$+ |
| 68 | 1.0 | NF$_2$O+ |
| 69 | 0.64 | CF$_3$+ |
| 99 | 0.97 | CF$_3$ON+ |
| 118 | 21.5 | CF$_4$ON+ |

Particularly noteworthy are the intensities of m/e value corresponding to the ions NF$_2$+ and CF$_4$ON+. The peak for m/e, 52, is usually intense for a carbon compound containing an NF$_2$ group, and corresponds to the base peak. The partner(s) of the NF$_2$ fragment did not ionize appreciably, inasmuch as peaks corresponding to the ions CF$_4$O$_2$N+ and CF$_2$O$_2$+ were insignificant.

F$^{19}$ nuclear magnetic resonance (N.M.R.) of Compound 1 shows two peaks, at 306 and 498 p.p.m. from F$_2$, corresponding respectively to the ONF$_2$ and the CF$_2$ groups. In p.p.m. from CFCl$_3$, these numbers correspond to −108 and +84, respectively. In addition, the area ratio of the −108 peak to the +84 peak was very close to 2 to 1, further confirming the structure CF$_2$(ONF$_2$)$_2$.

Compound 1 is reduced by potassium iodide, producing free iodine. It is known that one mole of CF$_2$(ONF$_2$)$_2$ will oxidize 4 moles of I$^-$. A sample of the compound was treated with an excess of potassium iodide and the resulting free iodine determined by titration with thiosulfate. By this method it has been demonstrated that the compound contains 4 active fluorine atoms per mole.

The molecular weight of a purified sample of

CF$_2$(ONF$_2$)$_2$ was determined by the gas density method. From these determinations, an average molecular weight of 187.7 g./mole was determined for the compound, which corresponds very well to the calculated molecular weight of 186 g./mole.

CF$_2$(ONF$_2$)$_2$ is a high performance oxidizer. Its relatively high boiling point renders it both earth and "space-storable." This combination of factors points to its additional utility in the field of liquid rocket propellants.

NF$_2$OCF$_2$OF — Compound 2

Figure 2:
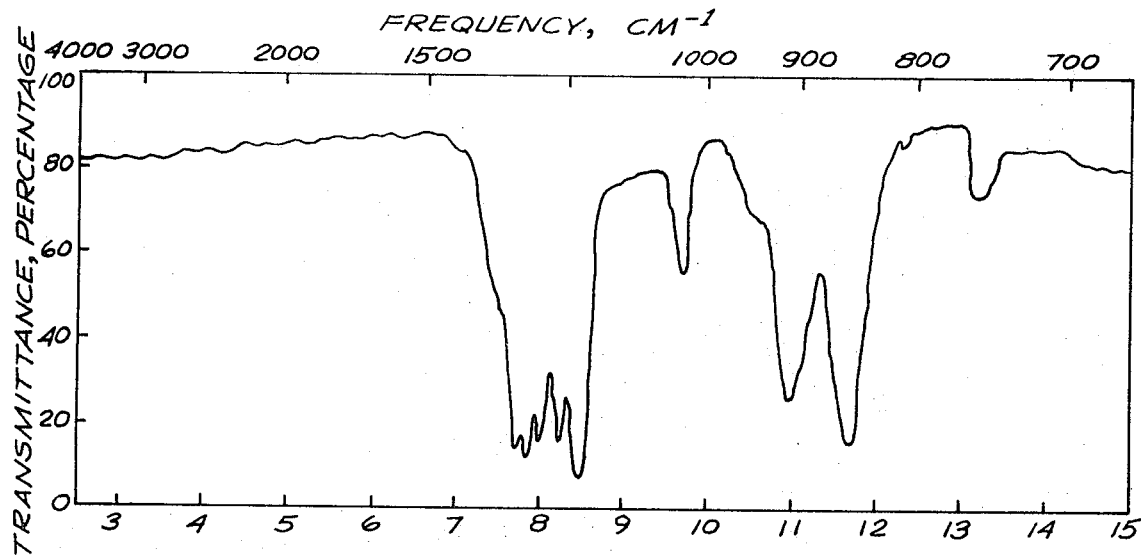

Vapor pressure data indicates that Compound 2 boils at about −29° C. Its characteristic infrared absorption spectra is illustrated in FIG. 2. It will be seen that the spectrum is similar to that of Compound 1, except that it is simpler in that ONF$_2$ region, i.e., from 11 to 12 microns. The F$^{19}$ N.M.R. spectrum shows peaks at 270 (triplet), 301 (broad unresolved singlet), and 507 (doublet) p.p.m. from F$_2$, in approximate ratios of 1:2:2, corresponding respectively to the OF, ONF$_2$ and the CF$_2$ groups; in p.p.m. from CFCl$_3$, these numbers correspond to −144, −113, and +93, respectively.

Compound 2 is also reduced by potassium iodide. A sample of the compound was treated with an excess of potassium iodide and the free iodine again determined by titration with thiosulfate. It was demonstrated that the compound contains 3 active fluorine atoms per mole.

The molecular weight of Compound 2 was determined by the gas density method. These determinations yielded a value of the molecular weight of 153 g./mole, which corresponds with the calculated molecular weight of 153 g./mole.

Compound 2 also finds additional utility in the field of liquid rocket propellants, having storage and oxidizing properties similar to Compound 1.

Due to their similar chemical and physical properties, Compounds 1 and 2 are mutually compatible. Mixtures of them may, therefore, suitably be used for many of the same purposes as either one of them separately.

The following example, in which all parts and percentages are given by weight, illustrates the novel compounds of this invention and their preparation.

EXAMPLE I

A 300 milliliter Pyrex reactor tube was charged with fusion dried KF powder (two grams) and HNF$_2$ (100 cc. at STP) at −126° C. The mixture was warmed to −80° C. for a few minutes to insure complete complex formation, and on recooling to −126° C., 50 cc. of the bis-hypofluoride, CF$_2$(OF)$_2$, was added to the complex. By leaving the −126° C. slush bath in place and allowing it to warm slowly, −80° C. was reached in approximately six hours. The products of the reaction were fractionated through −112, −126, −142 and −196° C. traps with pumping. The −126° C. trap contained 6 cc. of only CF$_2$(ONF$_2$)$_2$, Compound 1, while the −142° C. trap contained 7 cc. of only CF$_2$(ONF$_2$)OF, Compound 2. A small amount of NO$_2$ was trapped at −112° C. The −196° C. fraction contained CF$_3$ONF$_2$, CF$_2$, CO$_2$, CF$_4$, F$_3$, and N$_2$F$_4$. No HNF$_2$ was recovered, nor was any HF found. The yield of CF$_2$(ONF$_2$)$_2$ and CF$_2$(ONF$_2$)OF were equivalent and each corresponded to 15% of the limiting reagent, CF$_2$(OF)$_2$.

Although the invention has been described and illustrated in detail, it is to be clearly understood that the same is by way of illustration and example only and is not to be taken by way of limitation, the spirit and scope of this invention being limited only by the terms of the appended claims.

We claim:
1. The compound $F_2C(ONF_2)_x(OF)_y$ where $x$ is a whole integer from 1 through 2, and $y$ is 1 when $x$ is 1 and $y$ is 0 when $x$ is 2.
2. The compound of claim 1 where $x$ is 2.
3. The compound of claim 1 where $x$ is 1.
4. The method of producing the compound

$$F_2C(ONF_2)_x(OF)_y$$

where $x$ is a whole integer from 1 through 2, and $y$ is 1 when $x$ is 1 and $y$ is 0 when $x$ is 2, comprising:
reacting $F_2C(OF)_2$ and $MF \cdot HNF_2$, where M is a compound selected from the group consisting of K, Rb, and Cs, at temperatures between $-126°$ C. and $+27°$ C. and
recovering $CF_2(ONF_2)_x(OF)_y$ from the reaction mixture.
5. The method of claim 4 where excess $MF \cdot HNF_2$ is used to obtain predominantly the $F_2C(ONF_2)_2$ form of $F_2C(ONF_2)_x(OF)_y$.

References Cited
UNITED STATES PATENTS

| | | | |
|---|---|---|---|
| 2,689,254 | 9/1954 | Cady et al. | 260—453 |
| 3,214,465 | 10/1965 | Sausen | 260—583 X |

OTHER REFERENCES

Prager et al., J. Am. Chem. Soc., vol. 87, pp. 230 to 238 (1965).

LELAND A. SEBASTIAN, Primary Examiner

U.S. Cl. X.R.

149—109; 260—583 DD